United States Patent
Tadano

(10) Patent No.: US 12,544,911 B2
(45) Date of Patent: Feb. 10, 2026

(54) ARM STRUCTURE

(71) Applicant: RIVERFIELD INC., Tokyo (JP)

(72) Inventor: Kotaro Tadano, Tokyo (JP)

(73) Assignee: RIVERFIELD INC., Tokyo (JP)

( * ) Notice: Subject to any disclaimer, the term of this patent is extended or adjusted under 35 U.S.C. 154(b) by 0 days.

(21) Appl. No.: 18/954,891

(22) Filed: Nov. 21, 2024

(65) Prior Publication Data
US 2025/0073929 A1 Mar. 6, 2025

Related U.S. Application Data

(63) Continuation of application No. PCT/JP2022/021265, filed on May 24, 2022.

(51) Int. Cl.
| | |
|---|---|
| *B25J 9/10* | (2006.01) |
| *A61B 90/50* | (2016.01) |
| *B25J 9/00* | (2006.01) |
| *B25J 18/00* | (2006.01) |

(52) U.S. Cl.
CPC .......... *B25J 9/1065* (2013.01); *B25J 9/003* (2013.01); *B25J 9/106* (2013.01); *B25J 18/00* (2013.01); *A61B 2090/506* (2016.02)

(58) Field of Classification Search
CPC .... B25J 9/003; B25J 9/1065; A61B 2090/506
See application file for complete search history.

(56) References Cited

U.S. PATENT DOCUMENTS

| | | | |
|---|---|---|---|
| 3,995,746 A | 12/1976 | Usagida | |
| 4,666,364 A | 5/1987 | Doege et al. | |
| 6,748,819 B2 * | 6/2004 | Maeguchi | B25J 9/1065 |
| | | | 901/14 |
| 7,283,296 B2 | 10/2007 | Nozawa et al. | |
| 10,228,530 B2 | 3/2019 | Nakamura | |
| 2010/0139436 A1 | 6/2010 | Kawashima et al. | |
| 2018/0193107 A1 | 7/2018 | Suh et al. | |
| 2018/0243899 A1 | 8/2018 | Hashimoto et al. | |
| 2019/0223967 A1 | 7/2019 | Abbott et al. | |

(Continued)

FOREIGN PATENT DOCUMENTS

| | | | | |
|---|---|---|---|---|
| DE | 102015116174 A1 * | 3/2016 | ............ | B25J 9/1065 |
| EP | 1553887 B1 * | 4/2007 | ............ | A61B 34/70 |

(Continued)

*Primary Examiner* — Bobby Rushing, Jr.
(74) *Attorney, Agent, or Firm* — Sughrue Mion, PLLC

(57) ABSTRACT

An arm structure includes a shoulder joint, an elbow joint, a wrist joint, a first connection structure connecting the shoulder joint with the elbow joint and that relatively moves while maintaining an orientation of the elbow joint relative to the shoulder joint, a second connection structure connecting the elbow joint with the wrist joint and that relatively moves while maintaining an orientation of the wrist joint relative to the elbow joint, a third connection structure connecting the shoulder joint with the second connection structure and that relatively moves while maintaining an orientation of the wrist joint relative to the shoulder joint, a first actuator that rotates a first rotating shaft included in the first connection structure, and a second actuator that rotates a second rotating shaft included in the third connection structure. The first and second rotating shafts are supported by the shoulder joint.

10 Claims, 6 Drawing Sheets

(56) References Cited

U.S. PATENT DOCUMENTS

2021/0369478 A1   12/2021  Campeau-Lecours et al.
2021/0393350 A1   12/2021  Hongo et al.

FOREIGN PATENT DOCUMENTS

| EP | 3000565 A2 | * | 3/2016 | ............ B25J 9/1065 |
|----|---|---|---|---|
| GB | 2 085 398 A | | 4/1982 | |
| JP | 2-274482 A | | 11/1990 | |
| JP | 7-124877 A | | 5/1995 | |
| JP | 2020-69631 A | | 5/2020 | |
| JP | 2022-48173 A | | 3/2022 | |
| KR | 10-2013-0042247 A | | 4/2013 | |
| WO | 2008/108289 A1 | | 9/2008 | |
| WO | 2017/033353 A1 | | 3/2017 | |

* cited by examiner

ARM STRUCTURE

CROSS REFERENCE TO RELATED APPLICATION

This application is a continuation application of International Patent Application No. PCT/JP2022/021265 filed on May 24, 2022, the contents of which being incorporated by reference herein in its entirety.

BACKGROUND

The present disclosure relates to an arm structure and, for example, to an arm structure that can be applied to a medical robot.

In current medical settings, surgical robots (manipulators) aimed at reducing the burden on operators during operations have increasingly been used. For example, a minimally invasive computer-assisted teleoperated surgery system allowing an operator to control one or more master input devices to perform surgical procedures on a patient through movements of associated remotely operated tools has been devised.

SUMMARY

According to an aspect of one or more embodiments, there is provided an arm structure comprising a shoulder joint; an elbow joint; a wrist joint; a first connection structure connecting the shoulder joint with the elbow joint and being configured to relatively move while maintaining an orientation of the elbow joint relative to the shoulder joint; a second connection structure connecting the elbow joint with the wrist joint and being configured to relatively move while maintaining an orientation of the wrist joint relative to the elbow joint; a third connection structure connecting the shoulder joint with the second connection structure and being configured to relatively move while maintaining an orientation of the wrist joint relative to the shoulder joint; a first actuator configured to generate a force for rotating a first rotating shaft included in the first connection structure; and a second actuator configured to generate a force for rotating a second rotating shaft included in the third connection structure The first rotating shaft and the second rotating shaft are supported by the shoulder joint.

According to another aspect of one or more embodiments, there is provided an arm structure comprising a shoulder joint; an elbow joint; a wrist joint; a first connection structure connecting the shoulder joint with the elbow joint and being configured to relatively move while maintaining an orientation of the elbow joint relative to the shoulder joint; a second connection structure connecting the elbow joint with the wrist joint and being configured to relatively move while maintaining an orientation of the wrist joint relative to the elbow joint; a third connection structure connecting the shoulder joint with the second connection structure and being configured to relatively move while maintaining an orientation of the wrist joint relative to the shoulder joint; a first brake configured to generate a force for slowing down a first rotating shaft included in the first connection structure; and a second brake configured to generate a force for slowing down a second rotating shaft included in the third connection structure. The first rotating shaft and the second rotating shaft are supported by the shoulder joint According to yet another aspect of one or more embodiments, there is provided an arm structure comprising a shoulder joint comprising two shafts and an additional shaft; an elbow joint comprising two shafts; a wrist joint comprising two shafts; a first parallel link structure comprising two parallel links connected to the two shafts of the shoulder joint and the two shafts of the elbow joint, respectively; a second parallel link structure comprising two parallel links connected to the two shafts of the elbow joint and the two shafts of the wrist joint, respectively; an additional link connected to the additional shaft of the shoulder joint and to one of the two parallel links of the second parallel link structure; a first actuator that rotates a first shaft of the two shafts of the shoulder joint; and a second actuator that rotates a second shaft of the two shafts of the shoulder joint, wherein the additional shaft of the shoulder joint is connected to the second shaft of the two shafts of the shoulder joint via a link.

DETAILED DESCRIPTION

Figure 1:
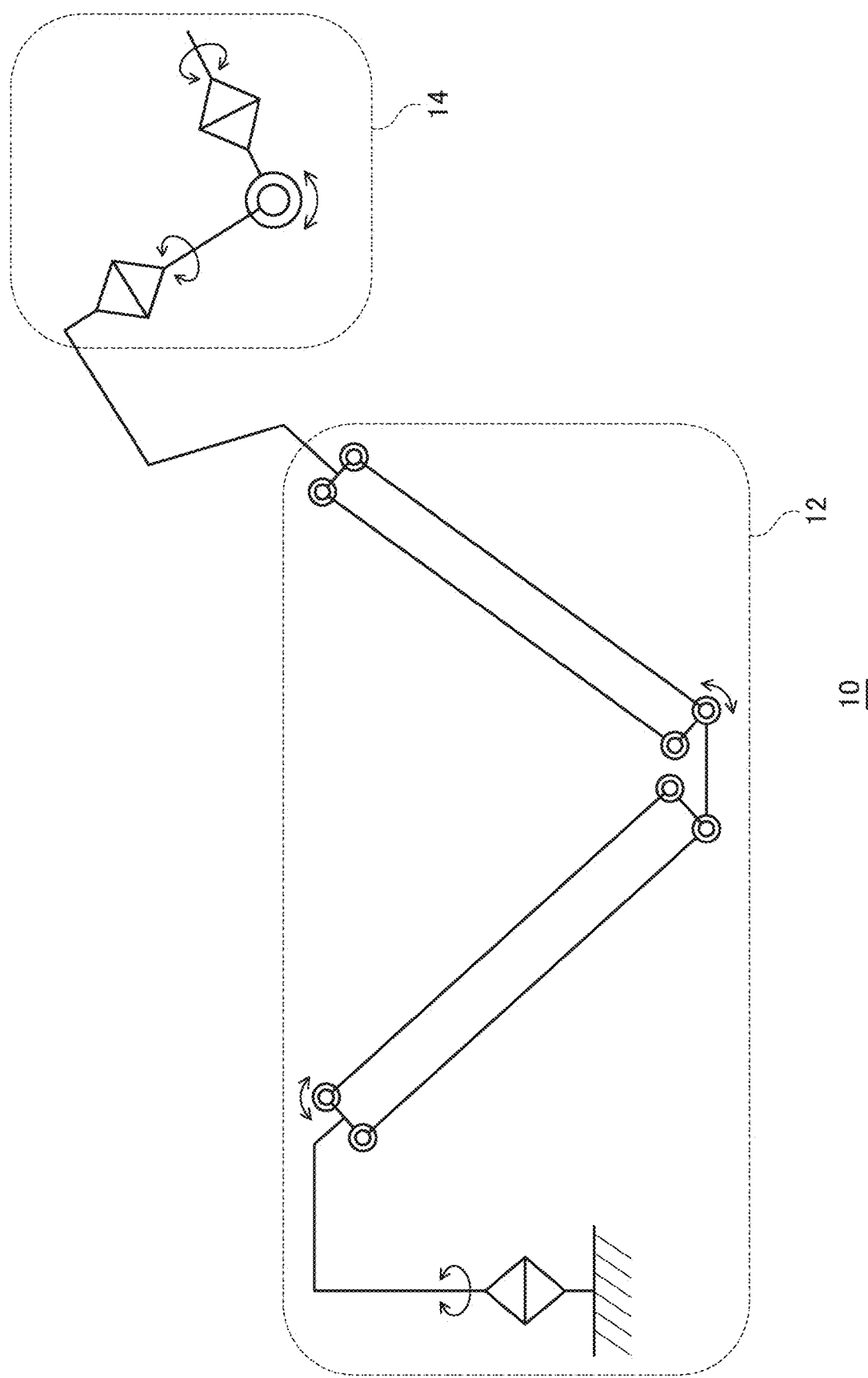
FIG. 1 is a schematic diagram for explaining a master manipulator according to a reference example.

A master input device, which is operated by an operator when using a surgical robot, may have an orientation part including a manipulator to be directly manipulated by the operator. The orientation part is advantageously configured not to change its orientation depending on its position. Such a configuration facilitates computation and control of the movements and orientations of various parts during remote operation. For example, a master manipulator may include a translation part with three degrees of freedom constituted by a Delta structure and an orientation part with four degrees of freedom connected with the translation part and constituted by a gimbal structure. The translation part of the master manipulator maintains the same orientation independently of the position of its portion connected with the orientation part.

The present disclosure has been made in view of the aforementioned circumstances, and an aspect thereof is to provide a novel arm structure that is different from conventional ones.

According to some embodiments, an arm structure may include a first joint; a second joint; a third joint; a first connection structure connecting the first joint with the second joint and being configured to relatively move while maintaining an orientation of the second joint relative to the first joint; a second connection structure connecting the second joint with the third joint and being configured to relatively move while maintaining an orientation of the third joint relative to the second joint; a third connection structure connecting the first joint with the second connection structure and being configured to relatively move while maintaining an orientation of the third joint relative to the first joint; a first driving source configured to generate a force for rotating a first rotating shaft included in the first connection structure; and a second driving source configured to generate a force for rotating a second rotating shaft included in the third connection structure. The first rotating shaft and the second rotating shaft are supported by the first joint.

According to this configuration, the second driving source, which generates the rotating force in response to the movement of the third joint, can be placed near the first joint together with the first driving source, which generates the rotating force in response to the movement of the second joint. In other words, the second driving source does not have to be placed at the second joint between the first joint and the third joint. Note that a rotating shaft may be referred to as a joint of links.

In some embodiments, the first connection structure may include a first parallel link structure. The second connection structure may include a second parallel link structure. The third connection structure may include a third parallel link structure. The third parallel link structure may share a first link with the first parallel link structure. Thus, according to this configuration, it is possible with a simple structure to freely move the third joint within a plane while maintaining the orientation of the third joint.

In some embodiments, the third connection structure may further include a fourth parallel link structure that shares a second link with the third parallel link structure. The fourth parallel link structure may include a third rotating shaft and a fourth rotating shaft that are supported by the second joint. The third rotating shaft may be located at an end of the second link. Thus, the third connection structure connects the first joint with the second connection structure via two parallel link structures and is configured to relatively move while maintaining the orientation of the third joint relative to the first joint.

In some embodiments, the fourth rotating shaft may be shared by the second parallel link structure and the fourth parallel link structure. This configuration allows the force rotating the second rotating shaft to be directly transmitted to the second parallel link structure by the third connection structure.

In some embodiments, the third parallel link structure may include a third link configured to move parallel to the first link, the first link connecting the second rotating shaft with the third rotating shaft. The third link may have a recess, the recess preventing interference with the second rotating shaft or the third rotating shaft when the third link moves parallel to the first link. The recess is, for example, a recessed region of a linear link. This configuration allows the first link and the third link to be closer to each other, which reduces the spaces occupied by the whole links between the first joint and the second joint.

In some embodiments, the fourth parallel link structure may include a fifth link configured to move parallel to a fourth link, the fourth link connecting the third rotating shaft with the fourth rotating shaft. The fifth link may have a recess, the recess preventing interference with the third rotating shaft or the fourth rotating shaft when the fifth link moves parallel to the fourth link. The recess is, for example, a recessed region of a linear link. This configuration allows the fourth link and the fifth link to be closer to each other, which reduces a space including the second joint and the fourth parallel link structure.

In some embodiments, the arm structure may further include: a manipulation part connected with the third joint; a base, wherein the first driving source and the second driving source are fixed to the base together with the first joint; and a third driving source configured to turn the base. The manipulation part may be configured to be movable with at least three degrees of freedom. Thus, in a case where the arm structure is used as a master manipulator arm of a remote operation system, three driving sources, which achieve three degrees of translation freedom, can be put together near the first joint, which reduces the inertia (moment of inertia) of the arm when the manipulation part is operated.

According to some embodiments, an arm structure may include a first joint; a second joint; a third joint; a first connection structure connecting the first joint with the second joint and being configured to relatively move while maintaining an orientation of the second joint relative to the first joint; a second connection structure connecting the second joint with the third joint and being configured to relatively move while maintaining an orientation of the third joint relative to the second joint; a third connection structure connecting the first joint with the second connection structure and being configured to relatively move while maintaining an orientation of the third joint relative to the first joint; a first brake configured to generate a force for slowing down a first rotating shaft included in the first connection structure; and a second brake configured to generate a force for slowing down a second rotating shaft included in the third connection structure. The first rotating shaft and the second rotating shaft are supported by the first joint.

According to this configuration, the second brake, which generates the braking force in response to the movement of the third joint, can be placed near the first joint together with the first brake, which generates the braking force in response to the movement of the second joint. In other words, the second brake does not have to be placed at the second joint between the first joint and the third joint.

Note that any combination of the components described above, and any expression in the various embodiments may be implemented in a method, a device, a system, and the like consistent with the various embodiments described herein.

According to various embodiments, a novel arm structure that is different from conventional ones can be achieved.

Various embodiments will now be described with reference to the drawings. Components, members, and processes that are the same as or equivalent to each other illustrated in the drawings are represented by the same reference numerals, and redundant explanation will not be repeated where appropriate for conciseness. The various embodiments are not to limit the present disclosure, but are provided as examples, and any feature or any combination of features described in the various embodiments is not necessarily essential.

An arm structure according to some embodiments is used for operation of a master manipulator of a master-slave surgical assist robot. An example of the surgical assist robot is one configured to operate forceps used in endoscopic surgery. Note that the application of the remote operation system is not limited to surgical assist robots. For example, the remote operation system may be used as a system for remotely operating robots used in logistics factories or manufacturing facilities. In particular, the remote operation system is suitable for remotely performing a process requiring long hours of delicate work by using a robot.

Note that the term "remote" not only includes a case where the physical distance between an operator and an object being operated is large but also a case where a master device operated by an operator and a slave device being operated is mechanistically separated from each other. In the latter case, the operation is remote operation even if the master device and the slave device are located close to each other.

In some embodiments, the arm structure can be applied to such uses as moving or holding a surgical tool, such as forceps or an endoscope, of a slave manipulator of a master-slave surgical assist robot at a site to be operated.

First, an outline structure of the master manipulator will be described. FIG. 1 is a schematic diagram for explaining a master manipulator according to a reference example. The master manipulator 10 illustrated in FIG. 1 includes a translation part 12 with three degrees of freedom, and an orientation part 14 with three degrees of freedom connected with the translation part 12. The orientation part 14 can gripped by an operator with a hand.

Figure 2:
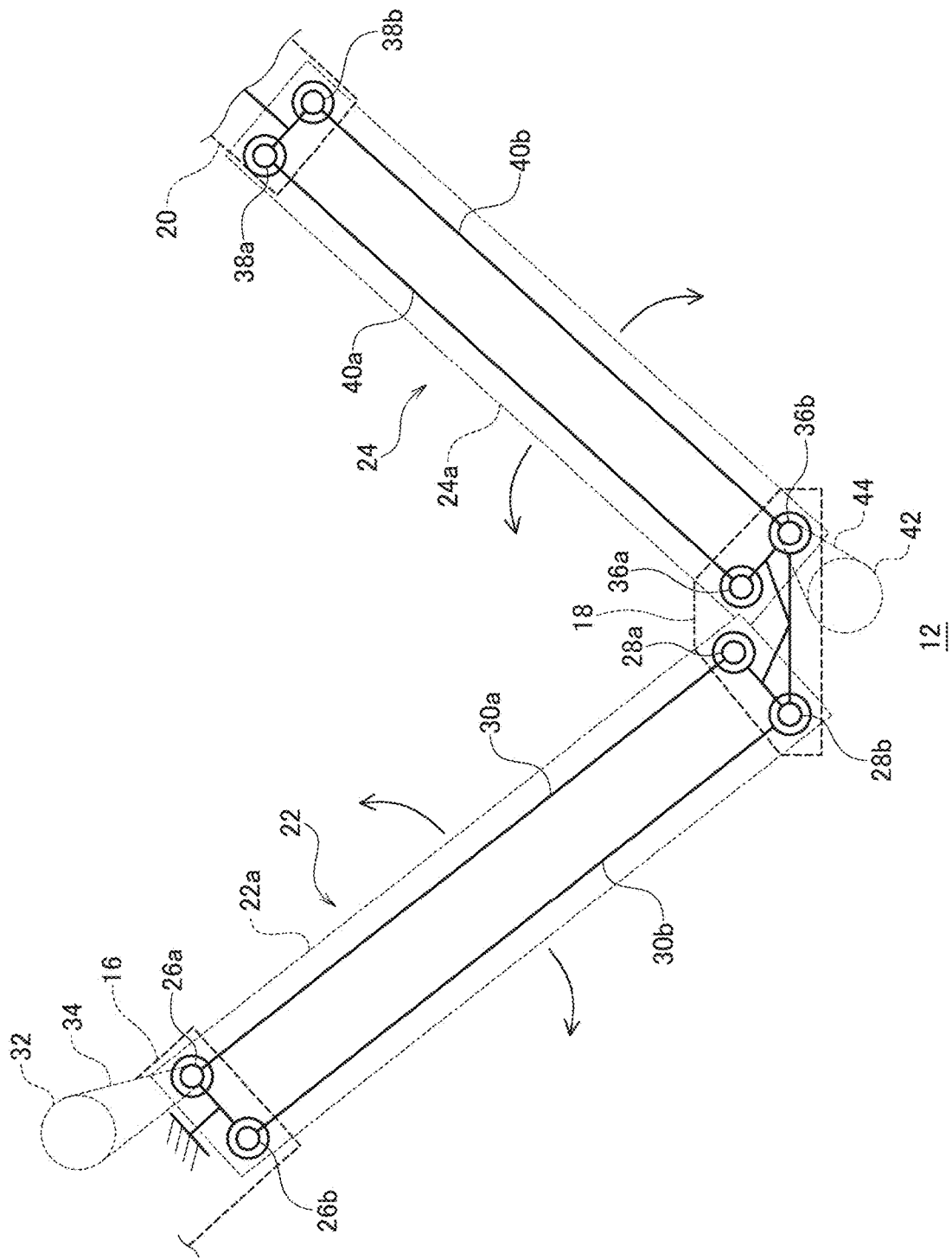
FIG. 2 is a schematic diagram for explaining the movement of an arm of a translation part of the master manipulator illustrated in FIG. 1.

FIG. 2 is a schematic diagram for explaining the movement of an arm of the translation part illustrated in FIG. 1. The translation part 12 illustrated in FIG. 2 includes a shoulder joint 16, which is a first joint, an elbow joint 18, which is a second joint, a wrist joint 20, which is a third joint, a first connection structure 22 connecting the shoulder joint 16 with the elbow joint 18 and being configured to relatively move while maintaining the orientation of the elbow joint 18 relative to the shoulder joint 16, and a second connection structure 24 connecting the elbow joint 18 with the wrist joint 20 and being configured to relatively move while maintaining the orientation of the wrist joint 20 relative to the elbow joint 18.

The first connection structure 22 includes two rotating shafts 26a and 26b supported by the shoulder joint 16, two rotating shafts 28a and 28b supported by the elbow joint 18, a link 30a having a rod-like shape connected with the rotating shaft 26a and the rotating shaft 28a, and a link 30b having a rod-like shape connected with the rotating shaft 26b and the rotating shaft 28b, all of which constitute a parallel link structure 22a. The shoulder joint 16 is provided with an actuator 32, which is a driving source that generates force for rotating the rotating shaft 26a.

The actuator 32 according to the reference example is a motor. The torque of the motor is transmitted to the rotating shaft 26a via a reduction structure 34. Another example of the actuator may be one using pneumatic pressure. The parallel link structure 22a swings up and down around the rotating shaft 26a as a fulcrum by the rotation of the actuator 32 as shown by arrows. During the swing, the elbow joint 18 relatively move while maintaining its orientation relative to the shoulder joint 16.

The second connection structure 24 includes two rotating shafts 36a and 36b supported by the elbow joint 18, two rotating shafts 38a and 38b supported by the wrist joint 20, a link 40a having a rod-like shape connected with the rotating shaft 36a and the rotating shaft 38a, and a link 40b having a rod-like shape connected with the rotating shaft 36b and the rotating shaft 38b, all of which constitute a parallel link structure 24a. The elbow joint 18 is provided with an actuator 42, which is a driving source that generates force for rotating the rotating shaft 36b.

The actuator 42 according to the reference example is a motor. The torque of the motor is transmitted to the rotating shaft 36b via a reduction structure 44. Another example of the actuator may be one using pneumatic pressure. The parallel link structure 24a swings up and down around the rotating shaft 36b as a fulcrum by the rotation of the actuator 42 as shown by arrows. During the swing, the wrist joint 20 relatively move while maintaining its orientation relative to the elbow joint 18.

As described above, the translation part 12 according to the reference example, the actuator 42 that generates force for rotating (driving) the rotating shaft 36b to swing the parallel link structure 24a is provided at the elbow joint 18. Thus, the elbow joint 18 is increased in size and weight. The present inventor has therefore conducted an intensive study, and, as a result, has conceived of an arm structure with a novel link structure, which will be described below.

Figure 3:
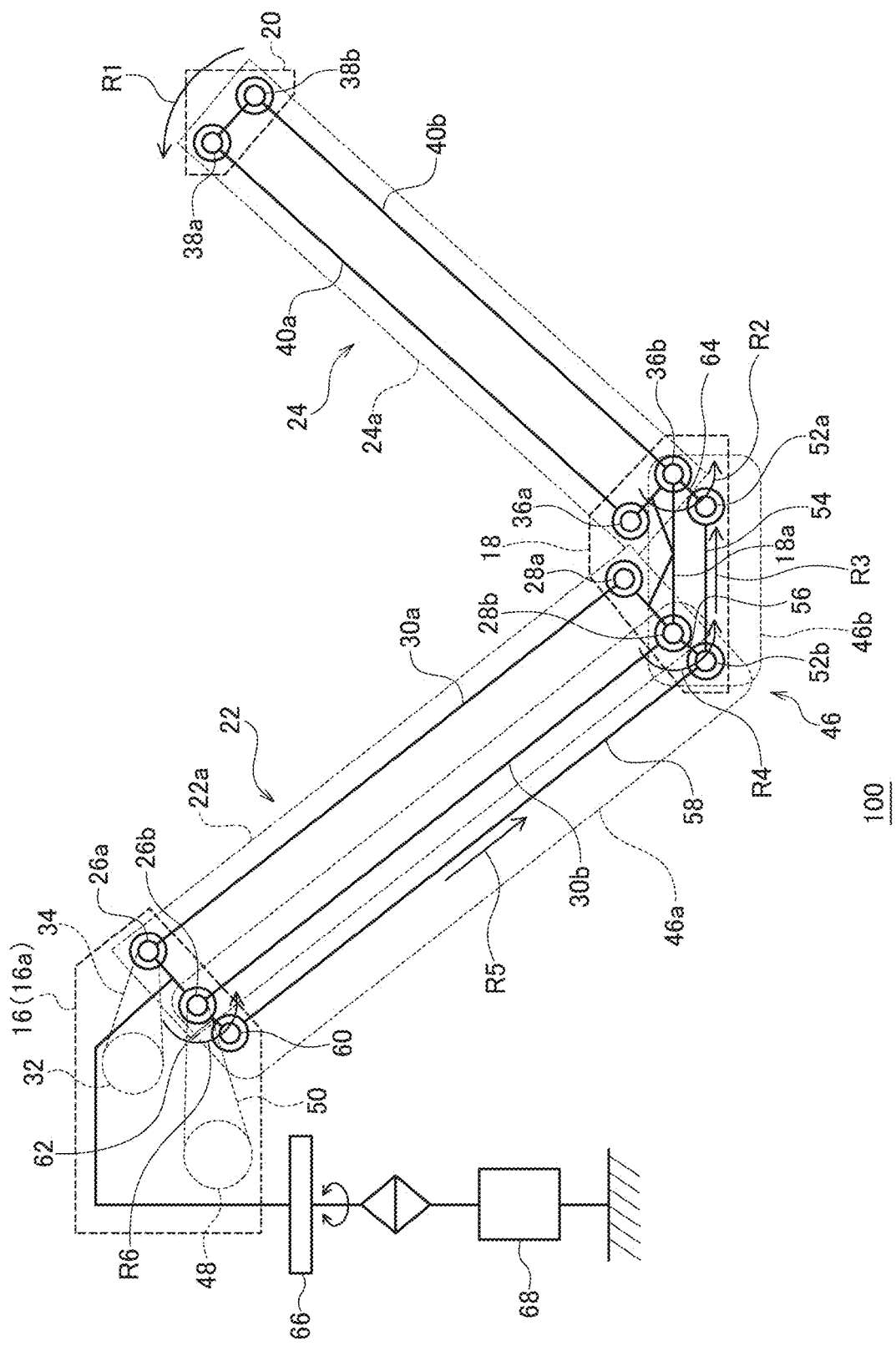
FIG. 3 is a schematic diagram for explaining an outline structure of an arm structure according to some embodiments.
Figure 4:
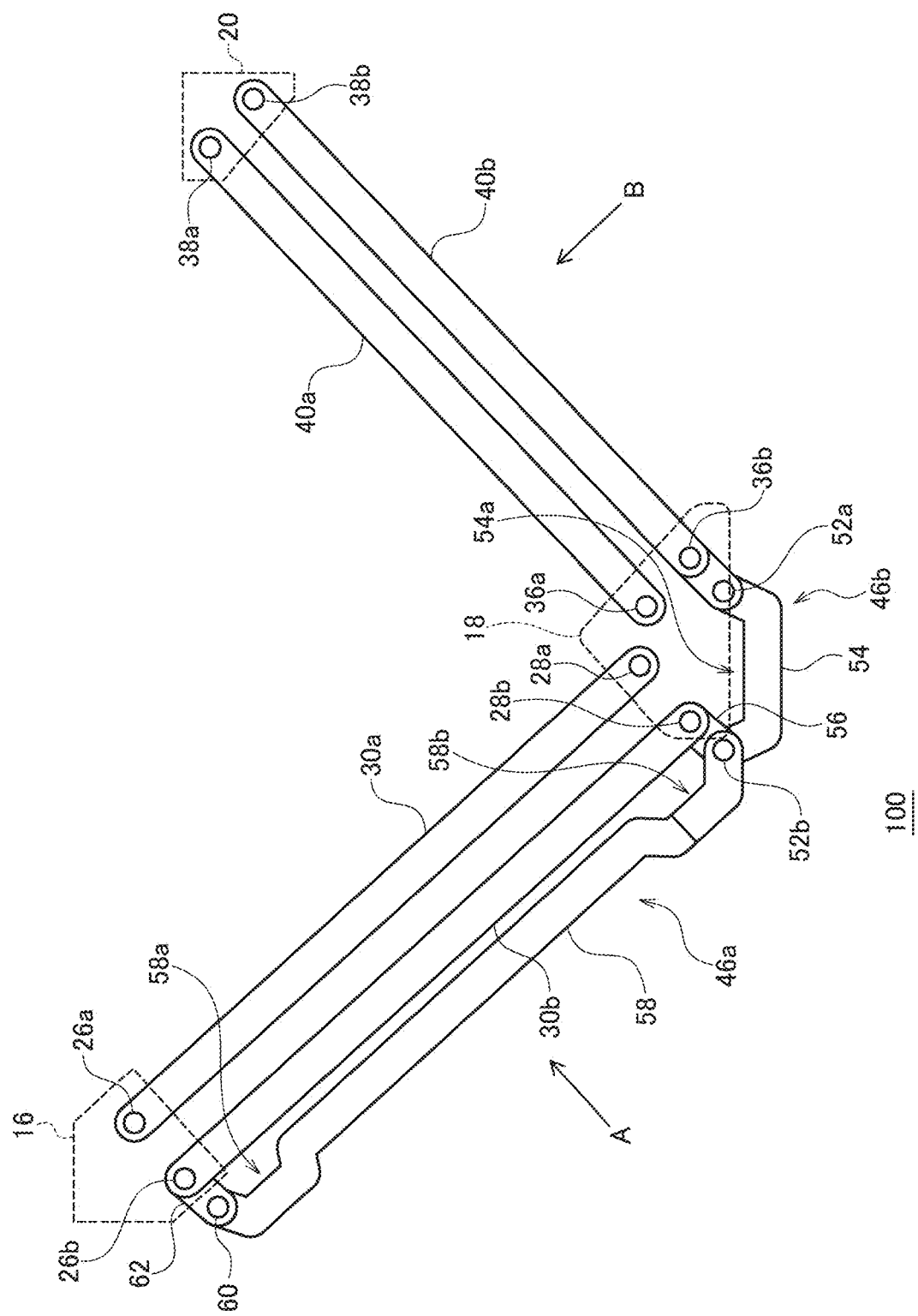
FIG. 4 is a schematic diagram for explaining link structures of the arm structure illustrated in FIG. 3, according to some embodiments.
Figure 5:
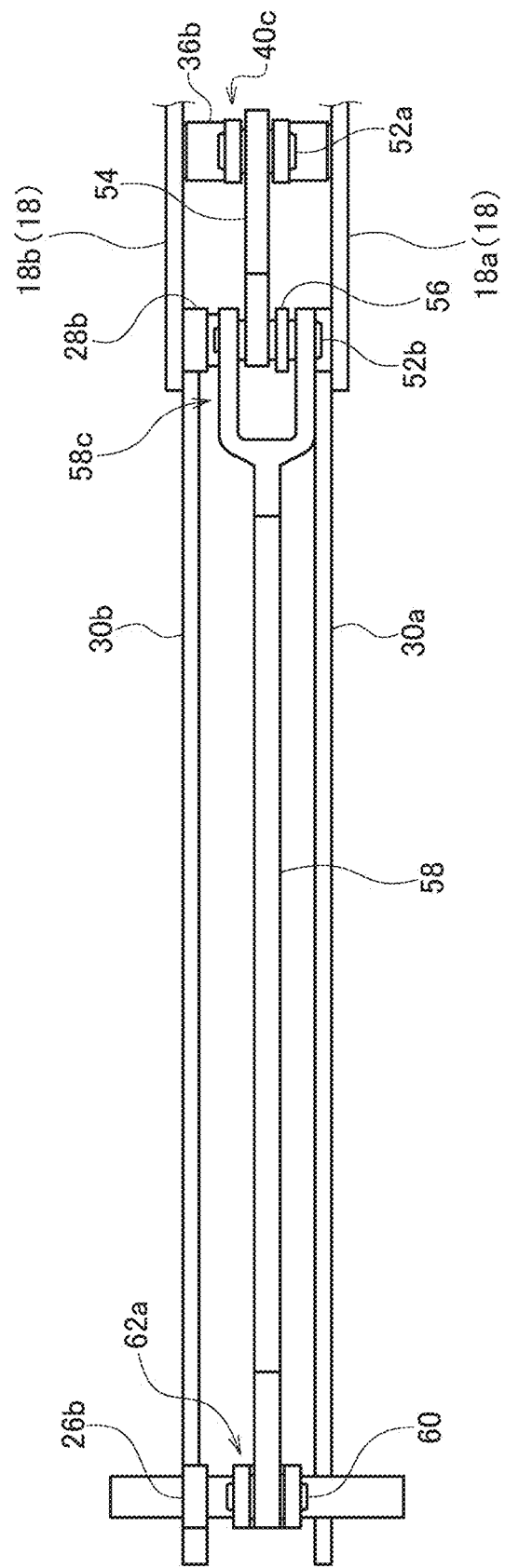
FIG. 5 is a side view of the arm structure illustrated in FIG. 3 as viewed in a direction A, according to some embodiments.
Figure 6:
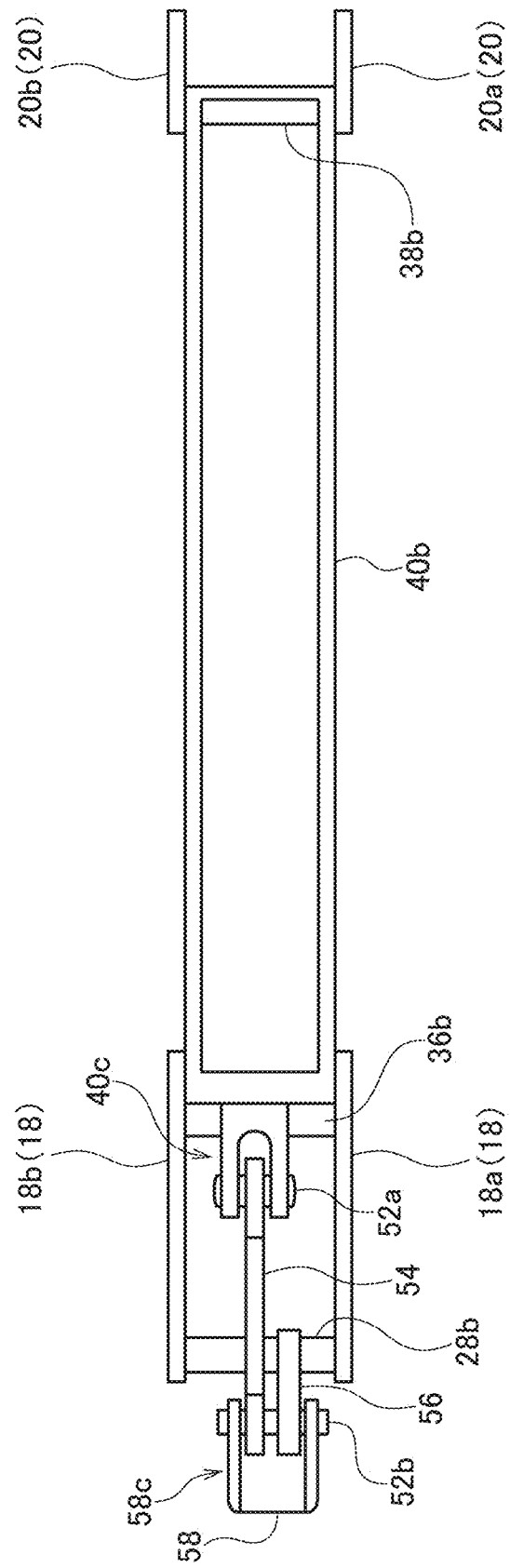
FIG. 6 is a side view of the arm structure illustrated in FIG. 3 as viewed in a direction B, according to some embodiments.

FIG. 3 is a schematic diagram for explaining an outline structure of the arm structure according to some embodiments. FIG. 4 is a schematic diagram for explaining the link structures of the arm structure illustrated in FIG. 3, according to some embodiments. FIG. 5 is a side view of the arm structure illustrated in FIG. 3 as viewed in a direction A, according to some embodiments. FIG. 6 is a side view of the arm structure illustrated in FIG. 3 as viewed in a direction B, according to some embodiments. Hereinafter, components that are similar to those in the reference example will be denoted by the same reference numerals and the description thereof will be omitted as appropriate.

According to some embodiments, an arm structure 100 may include a third connection structure 46 in addition to the first connection structure 22 and the second connection structure 24 described above. The third connection structure 46 connects the shoulder joint 16 with the second connection structure 24, and is configured to relatively move while maintaining the orientation of the wrist joint 20 relative to the shoulder joint 16. The arm structure 100 includes an actuator 48, which is a second driving source that generates force for rotating (driving) the rotating shaft 26b included in the third connection structure 46. In some embodiments, the actuator 48 may be a motor. The torque of the motor is transmitted to the rotating shaft 26b via a reduction structure 50. The rotating shafts 26a and 26b of the arm structure 100 are supported by the shoulder joint 16 as illustrated in FIG. 3.

According to this configuration, as the wrist joint 20 turns in a direction of an arrow R1, the rotating shaft 36b included in the parallel link structure 24a turns in a direction of an arrow R2. The rotating shaft 36b, which constitutes part of the second connection structure 24, also constitutes part of the third connection structure 46. A rotating shaft 52a included in the third connection structure 46 is located on the single link 40b together with the rotating shaft 36b and the rotating shaft 38b. As the rotating shaft 36b supported by the elbow joint 18 turns in the direction of the arrow R2, the rotating shaft 52a moves in a direction of an arrow R3 around the rotating shaft 36b as a fulcrum.

A rotating shaft 52b is connected with the rotating shaft 52a via a link 54, and slides (swings) with the movement of the rotating shaft 52a in the direction of the arrow R3. Note that the rotating shafts 52a and 52b are movable within a certain range relative to a plate 18a included in the elbow joint 18. As the rotating shaft 52b moves in the direction of the arrow R3, the rotating shaft 28b turns in a direction of an arrow R4 with a link 56 therebetween.

The rotating shaft 52b is connected with a rotating shaft 60, which is located at the shoulder joint 16, via a link 58. The rotating shaft 60 is connected with the rotating shaft 26b, which is supported by a plate 16a of the shoulder joint 16, via a link 62. As the rotating shaft 52b moves, the link 58 and the rotating shaft 60 move in a direction of an arrow R5, and the rotating shaft 26b turns in a direction of an arrow R6 in conjunction with the movement of the rotating shaft 60 with a link 62 therebetween.

As described above, in the arm structure 100, the movement of the wrist joint 20 is transmitted to the actuator 48 via the third connection structure 46. It is therefore possible to place the actuator 48, which generates the rotating force in response to the movement of the wrist joint 20, near the shoulder joint 16 together with the actuator 32, which generates the rotating force in response to the movement of the elbow joint 18. In other words, the arm structure 100, the actuator 48 does not have to be placed at the elbow joint 18 between the shoulder joint 16 and the wrist joint 20. This configuration thus decreases the size and weight of the elbow joint 18.

In some embodiments, in a case where the rotation of the rotating shaft 26*b* in response to the movement of the wrist joint 20 is detected by a rotation detector such as an encoder, for example, the force in the rotating direction can be generated by the actuator 48, which allows reduction of the burden on an operator operating the wrist joint 20. In some embodiments, a force in a direction opposite the rotating direction may be generated by the actuator 48, which allows an operator operating the wrist joint 20 to feel a moderate reaction force or holding force.

The third connection structure 46 includes the rotating shaft 26*b* supported by the shoulder joint 16, the rotating shaft 28*b* supported by the elbow joint 18, the link 30*b* connected with the rotating shaft 26*b* and the rotating shaft 28*b*, the rotating shaft 60 connected with the rotating shaft 26*b* via the link 62, the rotating shaft 52*b* connected with the rotating shaft 28*b* via the link 56, and the link 58 connected with the rotating shaft 60 and the rotating shaft 52*b*, all of which constitute a parallel link structure 46*a*. The parallel link structure 46*a* therefore shares the link 30*b* with the parallel link structure 22*a*. As a result, it is possible with a simple structure to freely move the wrist joint 20 within a plane while maintaining the orientation of the wrist joint 20. The plane may be predetermined.

The third connection structure 46 may also include another parallel link structure 46*b* that shares the link 56 with the parallel link structure 46*a*. The parallel link structure 46*b* includes the rotating shaft 28*b* supported by the elbow joint 18, the rotating shaft 36*b* supported by the elbow joint 18, the plate 18*a* that is a link connected with the rotating shaft 28*b* and the rotating shaft 36*b*, the rotating shaft 52*b* connected with the rotating shaft 28*b* via the link 56, the rotating shaft 52*a* connected with the rotating shaft 36*b* via a link 64, and the link 54 connected with the rotating shaft 52*a* and rotating shaft 52*b*.

In the parallel link structure 46*b*, the rotating shaft 28*b* and the rotating shaft 36*b* are supported by the plate 18*a* of the elbow joint 18, and the rotating shaft 28*b* is located at an end of the link 56. Thus, the third connection structure 46 connects the shoulder joint 16 with the second connection structure 24 via the parallel link structure 46*a* and the parallel link structure 46*b*, and is relatively movable while the orientation of the wrist joint 20 relative to the shoulder joint 16 is maintained.

The rotating shaft 36*b* is shared with the parallel link structure 24*a*. This configuration allows the force rotating the rotating shaft 26*b* generated by the actuator 48 to be directly transmitted to the parallel link structure 24*a* by the third connection structure 46.

Next, the shapes and the layout of the links will be described in further detail with reference to FIGS. 4 to 6. The parallel link structure 46*a* includes the link 58 that moves parallel to the link 30*b* connecting the rotating shaft 26*b* with the rotating shaft 28*b*. The link 58 has recesses 58*a* and 58*b* so as not to interfere with the rotating shaft 26*b* and the rotating shaft 28*b*, respectively, when moving parallel to the link 30*b*. In some embodiments, the recesses 58*a* and 58*b* may be recessed regions of the link 58 having a linear shape. This configuration allows the link 30*b* and the link 58 to be closer to each other, which reduces the spaces occupied by the whole links between the shoulder joint 16 and the elbow joint 18.

The parallel link structure 46*b* includes the link 54 that moves parallel to the plate 18*a* (18*b*), which is a link connecting the rotating shaft 28*b* with the rotating shaft 36*b*. The link 54 has a recess 54*a* so as not to interfere with the rotating shaft 28*b* and the rotating shaft 52*a* when moving parallel to and swinging relative to the plate 18*a*. In some embodiments, the recess 54*a* may be a recessed region of the link 54. This configuration allows the plate 18*a* and the link 54 to be closer to each other, which reduces the space including the elbow joint 18 and the parallel link structure 46*b*.

The link 58 has an end 58*c* being a U-shaped link on the side connected with the rotating shaft 52*b*. The link 54 and the link 56 are turnably supported on the inner side of the U shape by the rotating shaft 52*b*. The link 40*b* has an end 40*c* being a U-shaped link on the side connected with the rotating shaft 52*a*. The link 54 is turnably supported on the inner side of the U shape by the rotating shaft 52*a*. The link 62 has an end 62*a* being a U-shaped link on the side connected with the rotating shaft 60. The link 58 is turnably supported on the inner side of the U shape by the rotating shaft 60.

Next, a rotating structure of the entire arm structure 100 will be described. As illustrated in FIG. 3, the arm structure 100 includes a base 66 to which the actuator 32 and the actuator 48 are fixed together with the shoulder joint 16, and an actuator 68 that is a third driving source for turning the base 66. When the arm structure 100 is a master manipulator for medical use, the orientation part 14, which is a manipulation part, is connected with the wrist joint 20. As described above, the orientation part 14 is movable with at least three degrees of freedom. Thus, in a case where the arm structure 100 is used as a master manipulator arm of a remote operation system, the three driving sources (actuators such as motors), which achieve three degrees of translation freedom, can be put together near the shoulder joint 16, which reduces the inertia (moment of inertia) of the arm when the orientation part 14 is operated.

The arm structure 100 described above is an example in which the rotating shaft 26*a* and the rotating shaft 26*b*, which are input shafts, are used as drive (input) shafts and actuators are used as the driving sources. In some embodiments, an arm structure in which braking members (brakes) are used instead of the actuator 32 and the actuator 48 will be described. In the arm structure, brakes are connected with the rotating shaft and the rotating shaft 26*b*, for example. This configuration allows normally using a braking force to maintain the orientation and releasing a brake in an emergency so as to facilitate retraction of a surgical end effector (an intraocular endoscope, for example) connected with the wrist joint 20 from a site of operation. As a result, a braking member that generates a braking force in response to the movement of the wrist joint 20 can be placed near the shoulder joint 16 together with another braking member.

While various embodiments have been described above with reference to the drawings, the present disclosure is not limited thereto, and any combination or substitution of components described above as appropriate is included in the appended claims. In addition, modifications such as combinations, changes in the order of processes, and various changes in design in various embodiments may be made on the various embodiments on the basis of knowledge of a person skilled in the art, and such modified embodiments are included within the scope of the appended claims.

Various embodiments can be used in medical or transportation manipulators and the like.

What is claimed is:

1. An arm structure comprising:
   a shoulder joint;
   an elbow joint;
   a wrist joint;
   a first connection structure connecting the shoulder joint with the elbow joint and being configured to relatively move while maintaining an orientation of the elbow joint relative to the shoulder joint;
   a second connection structure connecting the elbow joint with the wrist joint and being configured to relatively move while maintaining an orientation of the wrist joint relative to the elbow joint;
   a third connection structure connecting the shoulder joint with the second connection structure and being configured to relatively move while maintaining an orientation of the wrist joint relative to the shoulder joint;
   a first actuator configured to generate a force for rotating a first rotating shaft included in the first connection structure; and
   a second actuator configured to generate a force for rotating a second rotating shaft included in the third connection structure,
   wherein the first rotating shaft and the second rotating shaft are supported by the shoulder joint.

2. The arm structure according to claim 1,
   wherein the first connection structure includes a first parallel link structure,
   wherein the second connection structure includes a second parallel link structure,
   wherein the third connection structure includes a third parallel link structure, and
   wherein the third parallel link structure shares a first link with the first parallel link structure.

3. The arm structure according to claim 2,
   wherein the third connection structure further includes a fourth parallel link structure that shares a second link with the third parallel link structure,
   wherein the fourth parallel link structure includes a third rotating shaft and a fourth rotating shaft that are supported by the elbow joint, and
   wherein the third rotating shaft is located at an end of the second link.

4. The arm structure according to claim 3,
   wherein the fourth rotating shaft is shared by the second parallel link structure and the fourth parallel link structure.

5. The arm structure according to claim 3,
   wherein the third parallel link structure includes a third link configured to move parallel to the first link, the first link connecting the second rotating shaft with the third rotating shaft, and
   the third link has a recess, the recess preventing interference with the second rotating shaft or the third rotating shaft when the third link moves parallel to the first link.

6. The arm structure according to claim 3,
   wherein the fourth parallel link structure includes a fifth link configured to move parallel to a fourth link, the fourth link connecting the third rotating shaft with the fourth rotating shaft, and
   wherein the fifth link has a recess, the recess preventing interference with the third rotating shaft or the fourth rotating shaft when the fifth link moves parallel to the fourth link.

7. The arm structure according to claim 1, further comprising:
   a manipulator connected with the wrist joint;
   a base, wherein the first actuator and the second actuator are fixed to the base together with the shoulder joint; and
   a third actuator configured to turn the base.

8. The arm structure according to claim 1, wherein the first actuator and the second actuator are motors.

9. The arm structure according to claim 1, wherein the first actuator and the second actuator are pneumatic actuators.

10. An arm structure comprising:
    a shoulder joint comprising two shafts and an additional shaft;
    an elbow joint comprising two shafts;
    a wrist joint comprising two shafts;
    a first parallel link structure comprising two parallel links connected to the two shafts of the shoulder joint and the two shafts of the elbow joint, respectively;
    a second parallel link structure comprising two parallel links connected to the two shafts of the elbow joint and the two shafts of the wrist joint, respectively;
    an additional link connected to the additional shaft of the shoulder joint and to one of the two parallel links of the second parallel link structure;
    a first actuator that rotates a first shaft of the two shafts of the shoulder joint; and
    a second actuator that rotates a second shaft of the two shafts of the shoulder joint,
    wherein the additional shaft of the shoulder joint is connected to the second shaft of the two shafts of the shoulder joint via a link.

* * * * *